US005301407A

United States Patent [19]

Koenig

[11] Patent Number: 5,301,407

[45] Date of Patent: Apr. 12, 1994

[54] RETAINING RING REMOVAL AND INSTALLATION TOOL

[75] Inventor: David D. Koenig, Oro Valley, Ariz.

[73] Assignee: Masco Building Products Corp., Taylor, Mich.

[21] Appl. No.: 982,795

[22] Filed: Nov. 30, 1992

[51] Int. Cl.[5] .......... B23F 19/04

[52] U.S. Cl. .......... 29/229

[58] Field of Search .......... 29/229, 270, 280, 278, 29/243.56

[56] References Cited

U.S. PATENT DOCUMENTS 2,829,548 4/1958 Byrd .
3,196,530 7/1965 Newbury .
3,256,595 6/1966 Boyden .
3,340,592 9/1967 Carpenter .
3,470,600 10/1969 Hosbach .
3,681,839 8/1972 Jamecka .
3,785,037 1/1974 Erdmann .
3,965,776 6/1976 Wolstenholme et al. .
4,135,284 1/1979 Nakamoto .
4,475,276 10/1984 Staten .
4,638,541 1/1987 Schindler, Jr. .
4,685,360 8/1987 McCurdy .
4,785,694 11/1988 Burmester .
4,873,754 10/1989 Gleasman .......... 29/229
5,022,292 6/1991 Hammer et al. .

FOREIGN PATENT DOCUMENTS 1-257575 10/1989 Japan .......... 29/280

*Primary Examiner*—Robert C. Watson
*Attorney, Agent, or Firm*—Myron B. Kapustij; Malcolm L. Sutherland

[57] ABSTRACT

A snap ring removal/installation tool for removing crescent shaped split snap ring from a snap ring retaining groove in a shaft. The tool comprises a flat, rigid body having a head at one end with an aperture extending therethrough. The aperture is comprised of a front section and a rear section. The front section is defined by a pair of spaced apart side walls joined by a curved front wall. The rear section is defined by a pair a spaced apart side walls joined by a curved rear wall opposite the curved front wall. The side walls of the rear section are spaced apart a lesser distance than the side walls of the front section, thereby defining laterally extending shoulders or ledges between said side walls of the rear section and the side walls of the front section. These shoulders serve as abutment members which engage the prongs of the snap ring to force the snap ring out of its retaining groove.

6 Claims, 2 Drawing Sheets

RETAINING RING REMOVAL AND INSTALLATION TOOL

FIELD OF THE INVENTION

The instant invention relates to a tool for removing and installing crescent shaped retaining rings on a cylinder plug.

BACKGROUND OF THE INVENTION

Normally cylinder plugs of locks are retained in a cylinder plug housing by, inter alia, a retaining ring disposed in a retaining ring groove on the cylinder plug stem. When it is desired to change the cylinder plug it is first necessary to remove the retaining ring from the retaining ring groove. The present invention provides a simple and easy to use hand tool for removing the retaining ring from the retaining ring groove in the stem of a cylinder plug so that the cylinder plug can be removed from its housing. The tool of the instant invention can also be used to insert the retaining ring into the retaining ring groove.

SUMMARY OF THE INVENTION

This invention comprises a hand tool for removing and installing a crescent or c-shaped retaining ring from a retaining ring groove in a cylinder plug stem The tool includes a head portion having an aperture therethrough. The aperture is comprised of a front portion and a back portion. The front portion is comprised of two spaced apart side walls and a curved front wall joining the side walls. The back portion is comprised of two spaced apart side walls and a curved back wall joining the two side walls. The side walls of the back portion are spaced apart a lesser distance than the two side walls of the front portion, thereby forming two shoulders.

In removing the crescent shaped retaining ring the ring is bodily thrust out of the retaining ring groove by a straight, radially directed push force of the tool. This is accomplished by the shoulders in the aperture exerting a pushing force upon the prongs of the retaining ring.

In installing the retaining ring the ring is pulled into the retaining ring groove by a straight, radially directed pulling force of the tool. This is accomplished by the front wall of the front portion of the aperture exerting a rearward force on the curved closed portion of the ring.

BRIEF DESCRIPTION OF THE DRAWINGS

In FIG. 4 the tool is pushed completely forwardly (to the right in FIG. 4).

DESCRIPTION OF THE PREFERRED EMBODIMENT

Figure 1:
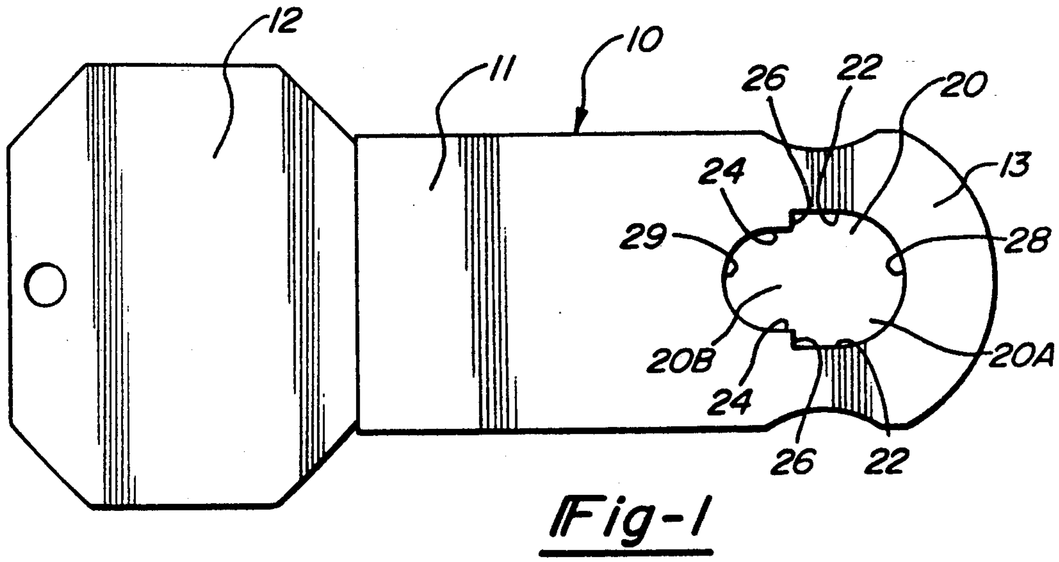
FIG. 1 is a top plan view of the tool of the present invention.
Figure 2:
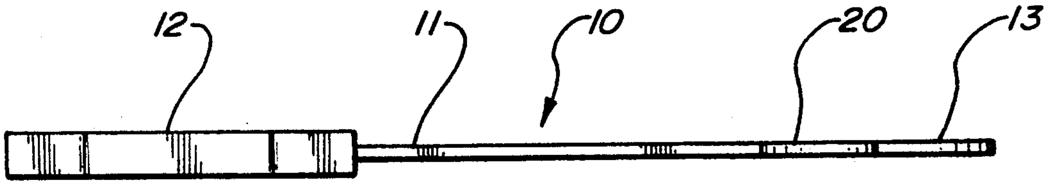
FIG. 2 is a side elevational view of the tool shown in FIG. 2.
Figure 3:
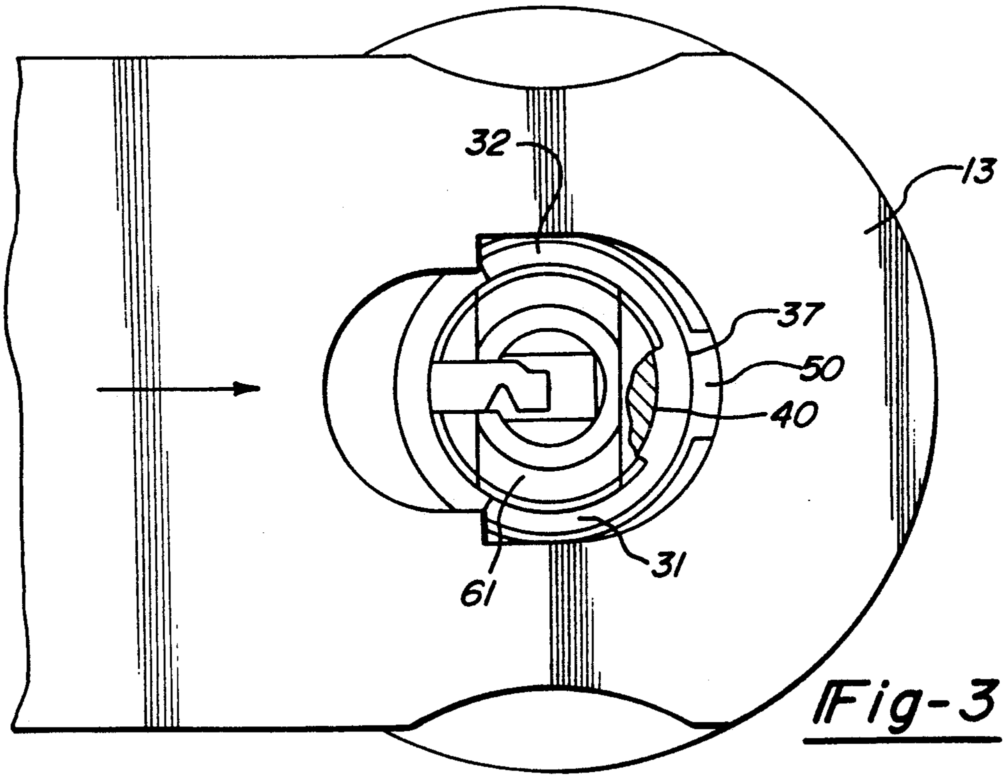
FIG. 3 is a partially broken away top plan view showing the tool placed over the cylinder plug shaft and the crescent shaped retaining ring with the shoulders of the aperture in the tool just engaging the prongs of the retaining ring, which retainer ring is mounted in the annular groove in the shaft. This view illustrates the position of the tool when the ring removal process is in it's initial stage, with the tool being pushed forwardly (to the right in FIG. 3) so as to have the shoulders in the apertures apply a pushing force on the prongs of the crescent shaped retainer ring.

As illustrated in FIGS. 1 and 2 the tool 10 comprises a flat elongated body 11 having a handle portion 12 at one end and a head portion 13 at the other end. An aperture 20 is formed in the head portion 13. The aperture 20 includes side walls 22 and side walls 24. Side walls 22 are spaced apart a greater distance than side walls 24 thereby forming shoulder elements 26. Side walls 22 are joined by a curved front wall 28, and side walls 24 are joined by a curved back wall 29.

Aperture 20 is divided into two sections. Front section 20A is defined by side walls 22, shoulders 26 and front wall 28. Rear section 20B is defined by side walls 24 and rear wall 29. The front section 20A is larger than rear section 20B.

Figure 4:
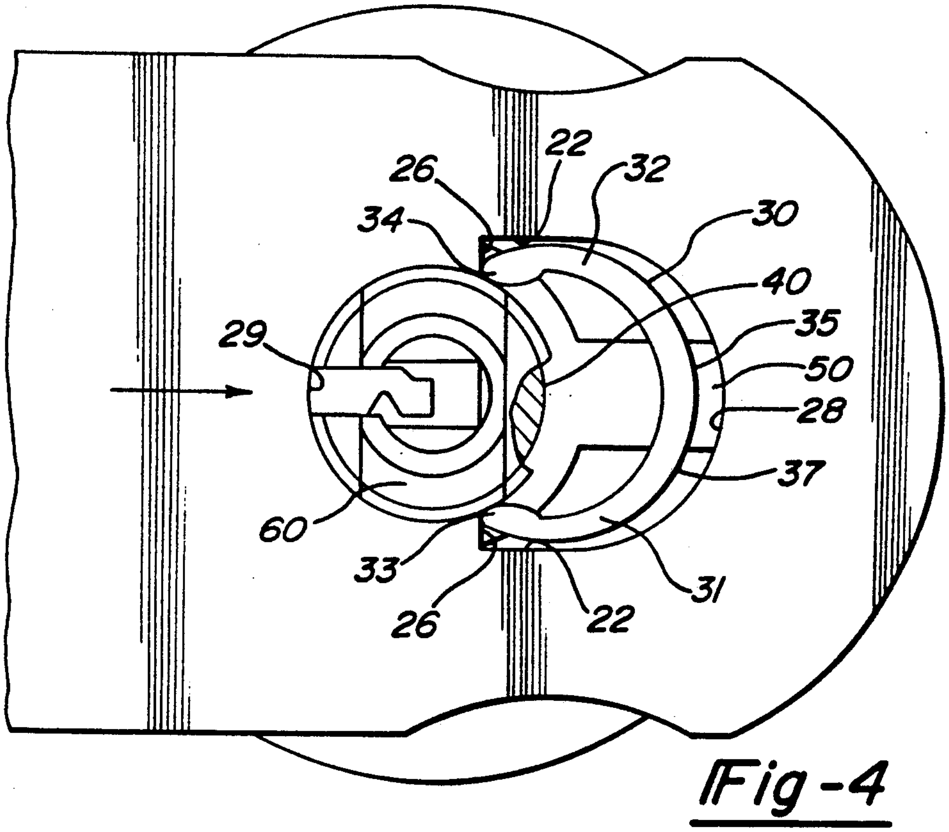
FIG. 4 is a view similar to FIG. 3 except that the crescent shaped retainer ring has been removed from the retainer ring groove in the cylinder plug shaft.
Figure 5:
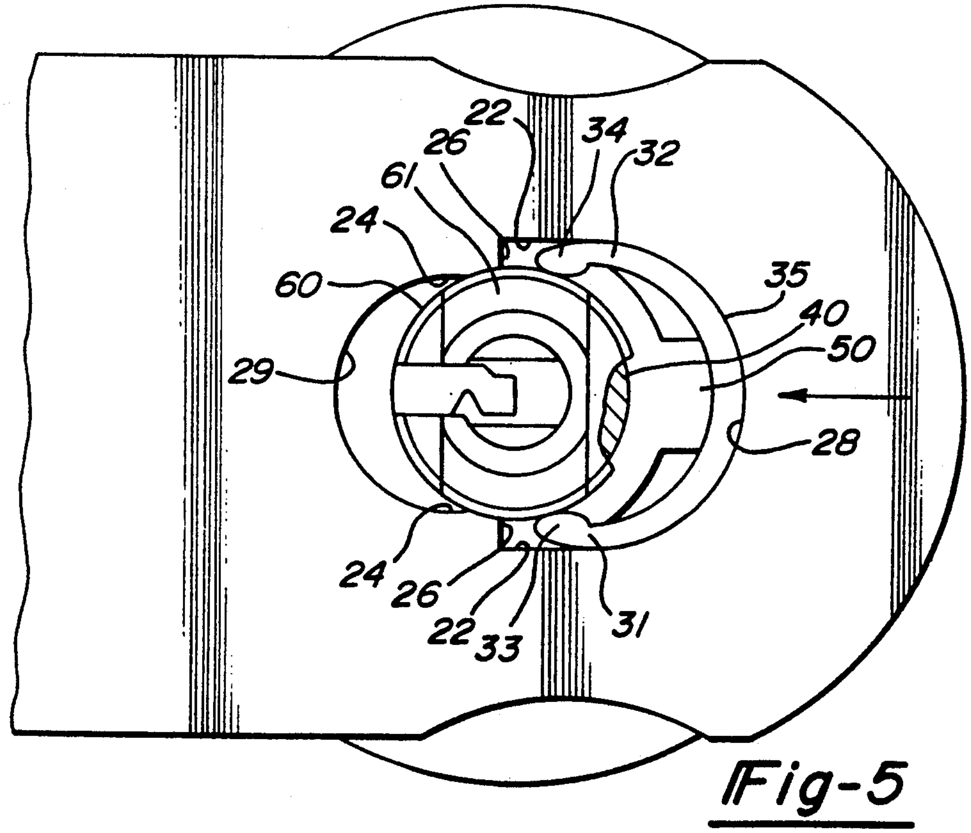
FIG. 5 is a view similar to FIG. 3 except that it shows the tool being used to insert the retaining ring into the retaining ring groove.

The side walls 22 are spaced apart by a distance slightly greater than the diameter, specifically the outer diameter or the diameter of the outer edge 37, of the crescent shaped retaining ring 30. The side walls 24 are spaced apart a lesser distance than side walls 22. Side walls 24 are spaced apart a distance which is less than the outer diameter of the retaining ring 30. Side walls 24 are spaced apart a distance which is slightly greater than the diameter of the annular retaining ring groove in the shank section 61 of the cylinder plug 60. As illustrated in FIG. 4 and 5 this allows for the groove 40 to be received between the side walls 24 when the tool is slid or pushed forward over the plug stem to remove the retaining ring 30 from the groove 40.

In using the tool, to remove the crescent shaped retaining ring front section **20*a* of aperture 20 is placed over the shank section 61 of the cylinder plug 60 and the retaining ring 30, with the ends or prongs 33, 34 of the two legs 31, 32 of the retaining ring 30 aligned facing the shoulders 26. The tool is then pushed forwardly, as illustrated in FIG. 4 causing the shoulders 26 to engage the prongs 33, 34 of the retaining ring 30 pushing the retaining ring forwardly. Forward movement of the retaining ring causes the legs 31, 32 of the retaining ring 30 to be spread apart until the retaining ring is removed from the groove 40, as illustrated in FIG. 4, at which point the two legs 31, 32 snap back to their original positions. During its forward movement the side walls 24 of the tool will slide over those portions of the annular groove 40 that have been vacated by the legs 31, 32 of the snap ring 30 in its forward movement. Once the retaining ring 30 is removed from the retaining ring groove 40, the cylinder plug 60 may be removed from its housing 50**.

As illustrated in FIG. 5 the tool 10 may be used to seat the retaining ring 30 in the annular groove 40. This may be accomplished by placing the tool 10 over the shank 61, with the tool pushed all the way forward so that the side walls 24 and rear wall 29 of the rear section 20B of the aperture 20 engage the retaining ring groove 40. In this position the front section 20A of the aperture 20 is forward of the shank 61. The snap ring 30 is placed within the front section 20A of aperture 20 with the prongs 33, 34 aligned with the shoulders 26. The tool 10 is then drawn or pulled in a backward direction, this results in front wall 28 of the aperture engaging the curved section 35 of the ring 30, thereby bringing ends 33, 34 into contact with the groove 40. Further rearward movement of the tool 10 results in corresponding rearward (to the left in FIG. 5) movement of ring 30, which results in the legs 31, 32 being spread apart by the inner wall of groove 40. Still further rearward movement of the tool 10 and retaining ring 30 results in the legs 31, 32 snapping back when the snap ring is pushed fully rearwardly over the groove thereby locking the snap ring 30 in position in the groove. The tool 10 is then lifted from the shank.

When the retaining ring 30 is disposed in the front aperture 20A, it is urged rearwardly by the front wall 28 contacting arcuate portion 35 of the retaining ring 30.

I claim:

1. A tool for removing and mounting a crescent shaped retaining ring having two end prongs disposed in an annular groove in a stem, said tool comprising a flat body having an aperture comprised of a front section and a contiguous rear section extending therethrough, said front section of said aperture adapted to seat said retaining ring in said groove and being defined by a first pair of spaced apart side walls and a front wall joining said side walls, said first pair of side walls being spaced apart a distance greater than the outer diameter of said retaining ring, said rear section of said aperture being defined by a second pair of spaced apart side walls disposed to the rear of said first pair of side walls, said second pair of side walls being spaced apart a smaller distance than said first pair of side walls thereby forming a pair of shoulders therebetween, said second pair of side walls being spaced apart a distance which is greater than the inner diameter of said annular groove, said shoulders adapted to engage said prongs of said retaining ring during removal of said ring, and a rear wall joining said second pair of side walls, said rear wall disposed opposite to said front wall, said front wall and said rear wall being curved in opposite directions.

2. The tool of claim 1 wherein said second pair of side walls is spaced apart a distance which is greater than the inner diameter of said annular groove but less than the outer diameter of said ring.

3. The tool of tool of claim 1 wherein said aperture is in the head of said tool.

4. The tool of claim 3 which further contains a handle.

5. The tool of claim 1 wherein said stem is a lock cylinder plug stem and whereby said ring, when disposed in said groove, serves to retain the cylinder plug to said lock cylinder plug stem.

6. A tool for removing and installing a crescent shaped retaining ring provided with two end prongs adapted for retention in and removal from an annular groove in a shaft member, said tool comprising a flat body having an aperture provided therein, said aperture having opposing ends adapted to install said retaining ring onto said shaft member within said annular groove and to completely disengage said retaining ring from engagement with said annular groove for removal of said retaining ring from said shaft member, said aperture being defined by a front section and a contiguous rear section, both the front section and the rear section defined by a curved wall joining a pair of spaced apart side walls, said pair of side walls of said front section being spaced apart a distance greater than the distance that the side walls of said rear section are spaced apart thereby forming a pair of shoulders therebetween, the curved wall of the rear section spaced from said shoulders at least a sufficient distance for enabling said shoulders to engage said end prongs to completely disengage said retaining ring from said shaft member.

* * * * *